United States Patent [19]

Sakuno et al.

[11] Patent Number: 4,964,791

[45] Date of Patent: Oct. 23, 1990

[54] APPARATUS FOR MANUFACTURING POWDER

[75] Inventors: Fumihiko Sakuno, Chiba; Hirofumi Sonoda, Sakura; Satoshi Honda, Tokyo; Ryouhei Kumagae, Machida, all of Japan

[73] Assignee: Nippon Steel Welding Products & Engineering Co., Ltd., Tokyo, Japan

[21] Appl. No.: 446,360

[22] Filed: Dec. 5, 1989

[30] Foreign Application Priority Data

Dec. 5, 1988 [JP] Japan .................. 63-307289

[51] Int. Cl.$^5$ ........................ B01J 2/00; B22F 9/10; B22F 9/14
[52] U.S. Cl. ........................................ 425/8; 264/8; 264/10; 425/174
[58] Field of Search ................ 425/8, 174; 264/8, 10

[56] References Cited

U.S. PATENT DOCUMENTS

| | | | |
|---|---|---|---|
| 3,099,041 | 7/1963 | Kaufman | 264/8 |
| 3,802,816 | 4/1974 | Kaufman | 425/8 |
| 3,963,812 | 6/1976 | Schluenger | 425/8 |
| 4,036,568 | 7/1977 | Morlet et al. | 425/8 |
| 4,259,270 | 3/1981 | Winter et al. | 425/8 |
| 4,408,971 | 10/1983 | Karinsky | 425/8 |
| 4,488,031 | 12/1984 | Roberts | 425/8 |
| 4,563,315 | 1/1986 | Walter et al. | 425/8 |
| 4,824,478 | 4/1989 | Roberts et al. | 425/8 |

Primary Examiner—Willard Hoag
Attorney, Agent, or Firm—Sughrue, Mion, Zinn, Macpeak & Seas

[57] ABSTRACT

A plurality of holders, each capable of holding a rod of raw material, and a single handler are equipped within a chamber which is adapted to be evacuated. An operator positions one of the holders at a location where it is opposite to a rotary shaft capable of driving the rod of raw material for rotation at a high speed. The operator then secures the rod held by the holder to the free end of the rotary shaft by handling the holder. A rod of raw material which has become consumed by granulation is separated from the rotary shaft by the handler which is operated by the operator. A fresh holder is then positioned at a location where it is opposite to the rotary shaft, and a rod of raw material which is held thereby is then secured to the rotary shaft.

7 Claims, 6 Drawing Sheets

APPARATUS FOR MANUFACTURING POWDER

FIELD OF THE INVENTION

The invention relates to the manufacture of powder in which a solid raw material is fed into a hermetically sealed space and then driven for rotation at a high speed while a plasma torch is disposed in opposing relationship with the foremost end face of the material and is activated to produce a plasma arc which is effective to cause a melting of the foremost end face, which is then scattered around at high speeds while it is in molten condition by a centrifugal action to thereby produce very fine particles, and in particular, to an apparatus for manufacturing powder for producing such powder in large quantities without opening the hermetically sealed space.

DESCRIPTION OF THE PRIOR ART

The manufacture of powder in a manner mentioned above is commonly referred to as a rotating electrode process, and is effective to produce in large quantities spherical fine particles having very small diameters and which are free from contamination. An apparatus of this kind is disclosed in U.S. Pat. Nos. 3,099,041 and 3,802,816 issued to Kaufmann and U.S. Pat. No. 4,408,971 issued to Karinsky.

In order to produce fine particles having relatively uniform diameters while minimizing contamination and oxidation by a process as mentioned above, a hermetically sealed space is provided for the treatment of powder or granulation. The space is first evacuated to high vacuum, and is then filled with an inert gas such as argon gas to a pressure above an atmospheric pressure. A rod of raw material is then driven therein for rotation at high speed, while a plasma torch is disposed in opposing relationship with a free end face of the rod to inject the inert gas against such end face, thus exposing the latter to a plasma arc. As the rod becomes consumed, it must be changed. This change requires the hermetically sealed space to be opened momentarily. However, if the hermetically sealed space or vessel is once opened, the evacuation must be repeated subsequently, thus requiring a length of time therefor. This presents difficulties of a lower manufacture yield and an increased power dissipation for the evacuation.

To accommodate for this, U.S. Pat. No. 3,802,816 discloses a manufacturing apparatus in which a solid cylindrical rod of raw material is inserted, through an interposed seal, into a backplate which defines a hermetically sealed space. A rotary shaft and a prime mover which are used to drive the rod for rotation are mounted on a carriage which is movable toward and away from the backplate on the outside of the space. A plasma torch having its forward end disposed in the hermetically sealed space is fixedly mounted on a front plate so that the free end of the torch is located opposite to the free end of the rod which has passed through the seal in the backplate. During the manufacture of powder, a plasma arc from the torch is effective to melt the free end of the rod, and the molten material is subject to a centrifugal force produced by the rotation of the rod at a high speed to be scattered radially of the rotary shaft in the form of fine particles. A mechanism carrying the rod and for driving it for rotation is advanced toward the torch as the rod becomes consumed. After a predetermined length of the rod has been consumed, another length of fresh rod material is disposed in abutment against the rear end face of the residue of the initial rod while it remains inserted through the seal in the backplate, and the mechanism is driven forward to push the fresh rod toward the hermetically sealed space through the seal until its front end is brought into the space, thus allowing the residue of the previous rod to fall down in the space. The rotary shaft is coupled to the fresh rod outside the space. In this manner, the material rod can be changed without opening the hermetically sealed space, or without experiencing a communication with the atmosphere. This dispenses with the evacuation, reducing the length of time required to change the material rod.

However, since the rod is subject to rotation at a ultra-high speed, the hermetic seal located between the backplate and the rod must be of a highly hermetically sealed and high speed rotating bearing construction. Furthermore, since the rod is not inherently manufactured as a shaft member, it must be machined to such a shaft member which is adapted to a highly sealed and high speed rotation. The machining of a material rod which is ultimately to be consumed into a shaft member of a high precision finish comparable to that required of a normal, highly sealed and high speed rotating shaft member results in an increased manufacturing cost of the resulting powder. It is difficult to provide a highly sealed and high speed rotating bearing construction which lends itself for cooperation with a material rod which is subject a relatively rough finish. Accordingly, it is concluded by conjecture that the described technique of maintaining the rod sealed against the backplate in the manner mentioned above is difficult to be adaptable to an actual operation while maintaining a high level of hermetic seal. A low level of seal allows oxygen to penetrate into the hermetically sealed space, causing fine particles produced to be oxidized to degrade the quality thereof.

SUMMARY OF THE INVENTION

It is an object of the invention to reduce the length of time required to change a material rod, including the evacuation, to thereby increase the manufacture yield, to reduce the power dissipation required for the evacuation and to enhance the quality of the powder manufactured.

An apparatus for manufacturing powder according to the invention comprises a first and a second vessel member (1, 3) which are movable relative to each other for defining a hermetically sealed space (PCS) in which granulation takes place; a rotary shaft (20) supported by the first vessel member (1) and carrying support means (201, 202, 203$_1$ to 203$_4$) at its free end which are used to support a member of raw material (18) disposed within the hermetically sealed space (PCS); drive means (27) for driving the rotary shaft (20) for rotation at a high speed; a support base (5) rotatably mounted on the second vessel member (3) about a center of rotation (C) which is displaced from the axis of the rotary shaft (20) and extending parallel thereto; a plasma torch (61) supported by the support base (5) on a circumference centered about the center of rotation (C) thereof and struck therefrom with a radius equal to a distance measured from the center of rotation (C) to the axis of the rotary shaft (20); a plurality of raw material holders (7$_1$ to 7$_8$) supported by the support base (5) on the circumference and each carrying a member of raw material (18); means (19, 77, 76$_1$ to 76$_4$) for securing the member of raw material (18) on one of the holders ($7_1$ to $7_8$) to the support means (201, 202, $203_1$ to $203_4$) on the rotary shaft (20); and a handler (9) supported by the support base (5) on circumference for removing the member of raw material (18) supported by the support means (201, 202, $203_1$ to $203_4$) on the rotary shaft (20) from such support means. It is to be understood that numerals appearing in the above definition corresponds to elements or parts appearing in an embodiment to be described later in connection with the drawings.

In operation, an operator opens one of the first and the second vessel members (1, 3) relative to the other, mounts a member of raw material (18) on each of the holders ($7_1$ to $7_8$), then closes the first and the second vessel members together, and evacuates the hermetically sealed space (PCS) to a given pressure, whereupon the space is filled with an inert gas to a required pressure. Before or after the evacuation and the filling with the inert gas, the member (18) on one of the holders, for example, ($7_1$), which is disposed opposite to the rotary shaft (20) is mounted thereon using the securing means (19, 77, $76_1$ to $76_4$) If none of the holders is located opposite to the rotary shaft (20), the support base (5) is rotated to bring one of the holders into opposing relationship with the rotary shaft and then the member is mounted thereon.

Subsequent to the evacuation, the filling of the inert gas and mounting the member (18) on the rotary shaft (20), the support base (5) is rotated to position the plasma torch (61) to a location where it is disposed opposite to the foremost end face of the member (18) mounted on the shaft (20). The shaft (20) is then driven for rotation, and when the speed of rotation thereof reaches a given high value, an injection of plasma is initiated. A plasma is injected and impinges upon the foremost end face of the member (18) which is mounted on the shaft (20), whereby the end face becomes melted beginning from its center. Since the member (18) is rotating at a high speed, the molten material will be scattered radially with respect to the rotation, by the action of the centrifugal force, in the form of very fine particles, and particles become solidified into spheroidal particles as they are cooled down by the scattering movement and then fall down. The plasma torch is driven toward the member (18) by an electrically driven mechanism so as to maintain a given distance between the foremost end face of the member (18) and the free end of the torch as the melting and the scattering of particles occur.

When the member (18) mounted on the shaft (20) leaves a residue of a given size, the operator stops the plasma injection and returns the plasma torch to a standby position. The support member (5) is then rotated to bring the handler (9) into opposing relationship with the rotary shaft (20), and the used member (18) is removed from the shaft (20) by utilizing the handler (9). The support base (5) is rotated once again to bring another holder (for example, $7_2$) into opposing relationship with the rotary shaft (20), and its associated securing means (19, 77, $76_1$ to $76_4$) is used to mount this new member (18) on the rotary shaft (20). The support base (5) is then rotated to position the plasma torch (61) to a location where it is disposed opposite to the foremost end face of the new member (18) mounted on the shaft (20). The shaft (20) is driven for rotation, and when the speed of rotation thereof reaches a given high value, the plasma injection is initiated.

A similar process is repeated and each time the residue of the member (18) mounted on the shaft (20) reaches a given size, the plasma injection is interrupted momentarily, and the used member (18) is removed from the shaft (20) while a fresh member (18) is mounted thereon.

In this manner, a number of members (18) stored on the holders ($7_1$ to $7_8$), which is eight in number in the embodiment to be described later, can be granulated into powder after a single evacuation. When the granulation of all these members has been completed, the operator opens one of the first and the second vessel members (1, 3) from the other, and mounts members of raw material (18) on the respective holders ($7_1$ to $7_8$), closes the first and the second vessel members (1, 3) together, and evacuates the hermetically sealed space (PCS) to a given pressure. The described process repeats itself as before.

Thus it will be seen that a number (n) of members (18) can be granulated into powder after a single evacuation. By contrast, in the prior art practice, the granulation of a single member required a single evacuation before it can take place, and the evacuation requires a relatively long time and dissipates an increased amount of power. However, in accordance with the invention, the granulation of a plurality (n) of members of raw material requires a single evacuation, and thus a saving is achieved which is equivalent to $(n-1)$ times the evacuation, thus simultaneously increasing the working efficiency of the apparatus and reducing the power dissipation for the evacuation.

In addition, no hermetic seal is provided between the member of raw material (18) and the vacuum vessel, and thus dispenses with the need to machine the member (18) to a shaft member which is adapted to a highly sealed and high speed rotation, thus reducing the granulation cost. It is only necessary that highly sealed and high speed rotation seal be provided for the rotary shaft (20) on which the member (18) is supported. Since it is for permanent use, it can be designed and constructed to provide a high level of hermetic seal, reducing the cost per member (18). In addition, a structure which effectively prevents the penetration of oxygen into the hermetically sealed space (PCS) may be provided. This assures a high quality of powder or fine particles which are substantially free from any oxidation effect.

Other objects and features of the invention will become apparent from the following description of an embodiment thereof with reference to the drawings.

DESCRIPTION OF EMBODIMENT

Figure 1:
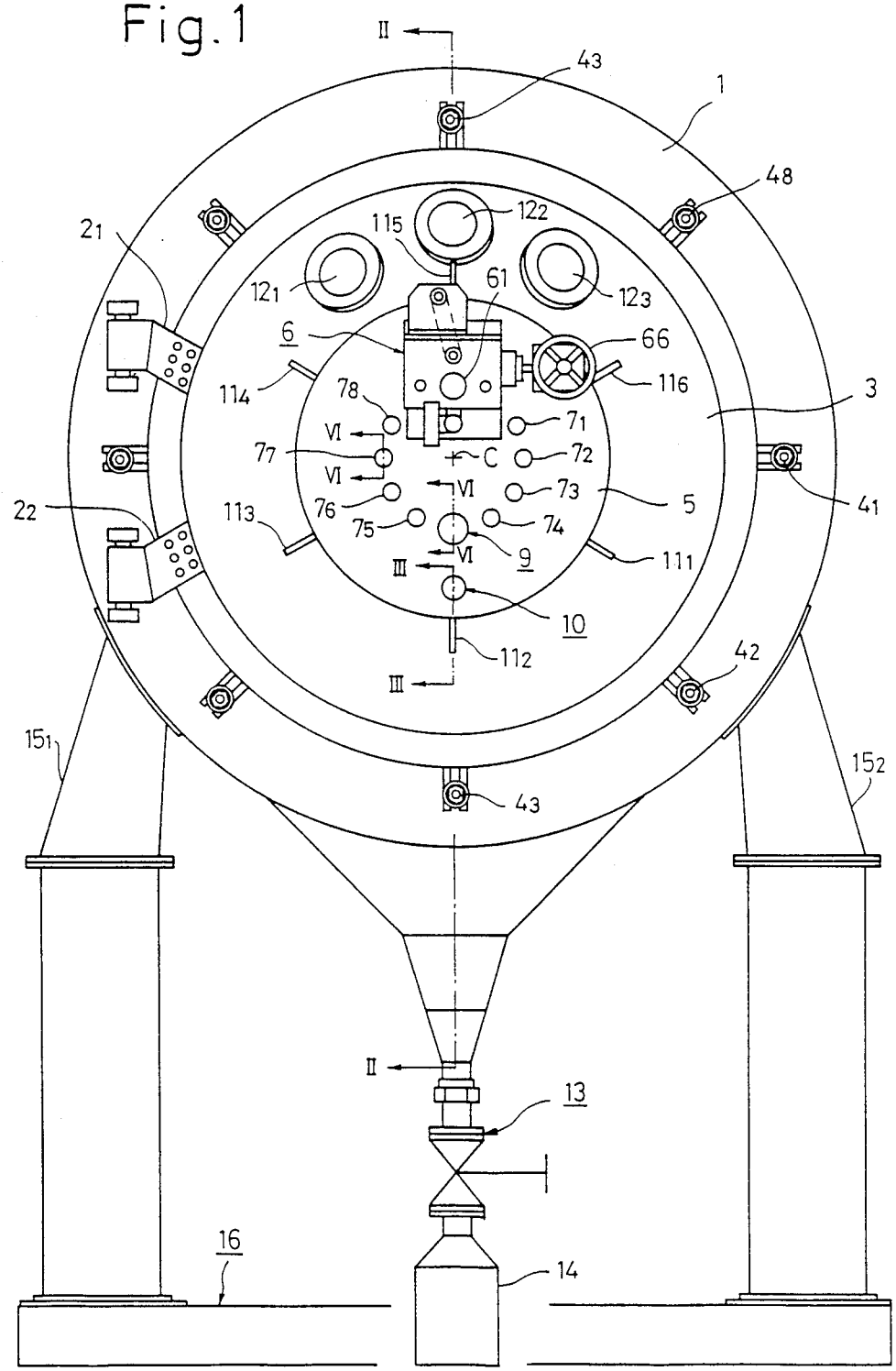
FIG. 1 is a front view of one embodiment of the invention.

Referring to FIG. 1 which shows one embodiment of the invention, a first, substantially cylindrical vessel member 1 has a circular opening formed in its one end face, which is closed by a second vessel member 3 that is pivotally connected to the vessel member 1 by hinges $2_1$, $2_2$.

Figure 2:
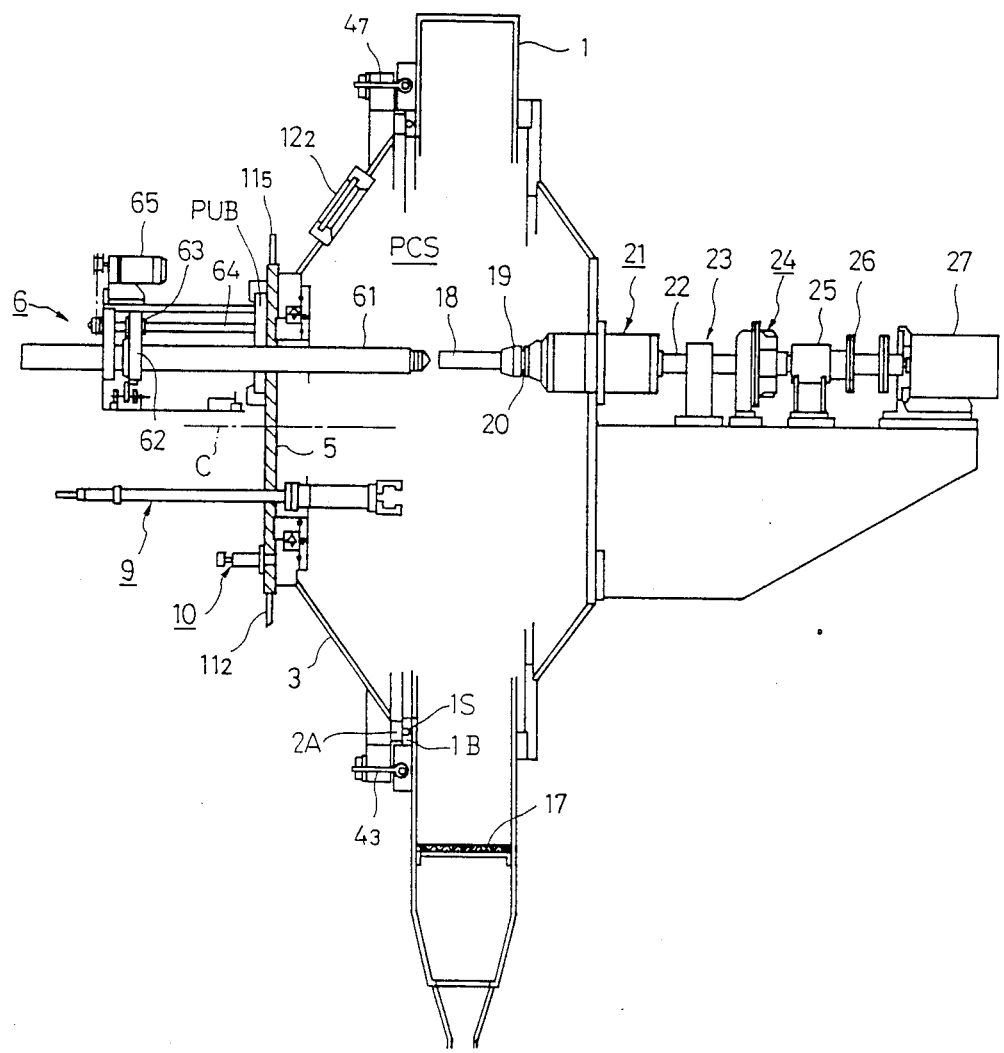
FIG. 2 is a cross section taken along the line II—II shown in FIG. 1.

Referring to FIG. 2 which is a cross section taken along the line II—II shown in FIG. 1, an annular seal mount 1B which is provided with an annular seal 1S is secured around the edge of an opening in the first vessel member 1 while an annular seal abutment 2A is secured around a circular edge of the second vessel member 3 in opposing relationship with the seal 1S. The second vessel member 3 is rotatable or swingable about an axis defined by the hinges $2_1$, $2_2$ with respect to the first vessel member 1.

Referring to FIGS. 1 and 2, a plurality of bolts $4_1$ to $4_8$ are fixedly connected to the first vessel member 1 around the opening and at an equal spacing so as to be swingable between its erected and a prostrate position with respect to the front surface of the member 1 at their lower ends. Each bolt passes through a washer. A nut threadably engages the free end of the bolt which has passed through the washer. A bolt abutment corresponding to each bolt is secured to the side surface around the circumference of the second vessel member 3.

When fastening the second vessel member 3 to the first vessel member 1 in a hermetically sealed manner, each bolt is brought to its erected position with respect to the front surface of the member 1, the washer is positioned over the bolt abutment of the member 3, and the nut is tightened. In this manner, the seal 1S on the member 1 is compressed by the abutment member 2A associated with the member 3, whereby a hermetically sealed space (PCS) for granulation is defined by the first and the second vessel member 1, 3 as isolated from an external space. FIG. 1 shows the second vessel member 3 in a hermetically sealed condition. When it is desired to open the second vessel member 3 and hence the hermetically sealed space PCS, nuts threadably engaging the bolts $4_1$ to $4_8$ are loosened, and the bolts $4_1$ to $4_8$ are brought to their prostrate position substantially parallel to the front surface of the member 1, and then the second vessel member 3 is turned about the hinges $2_1$, $2_2$.

The second vessel member 3 has a circular opening, in which a support plate 5 is mounted so as to be rotatable peripherally of the opening. The support plate 5 carries a plasma torch unit 6, material rod holders $7_1$ to $7_8$, a rod removal handler 9 and a latch 10.

Referring to FIG. 2, the plasma torch unit 6 essentially comprises a plasma torch 61 extending parallel to a rotary shaft 20, to be described later, and supported by the support plate 5 in an axially reciprocable manner with a hermetic seal interposed therebetween and having its forward portion located within the sealed space PCS and having its rear portion located outside such space PCS, a retainer 62 secured to the plasma torch 61 outside the space PCS, a nut 63 integrally secured to the retainer 62, a threaded shaft 64 threadably engaging the nut 63 and extending parallel to the rotary shaft 20, and a motor unit 65 including a reduction gearing which drives the threaded shaft 64 for rotation in either forward or reverse direction. The threaded shaft 64 is rotatably connected to a unit base PUB on which a mount for carrying the motor unit 65 is fixedly mounted. The plasma torch 61 extends through the unit base PUB. The unit base PUB is mounted on the support plate 5 so as to be rotatable about the plasma torch 61. Coupled to the unit base PUB is a handle 66 (see FIG. 1) through an angle of rotation adjusting mechanism, which is not shown. By turning the handle in one direction or the other while maintaining the plasma torch 61 in opposing relationship with the rotary shaft 20 as shown in FIG. 2, the plasma torch 61 rotates about its axis, thus allowing an angle of rotation (rotational position) of the torch 61 to be adjusted. When the motor unit 65 drives the threaded shaft 64 for rotation in the forward direction, the torch 61 is driven toward a rod 18 of raw material. When driven for rotation in the reverse direction, the unit causes the torch 61 to be driven away from the rod 18.

The plasma torch 61 is disposed on a circumference which is struck with a radius equal to a distance between the center of rotation C of the support plate 5 and the axis of the shaft 20, and material rod holders $7_1$ to $7_8$ and the rod removal handler 9 are also disposed on this circumference. The latch 10 is located outside the circumference. Accordingly, the torch 61, the holders $7_1$ to $7_8$ and the handler 9 can be selectively positioned into opposing relationship with the shaft 20 by turning the support plate 5.

Figure 3:
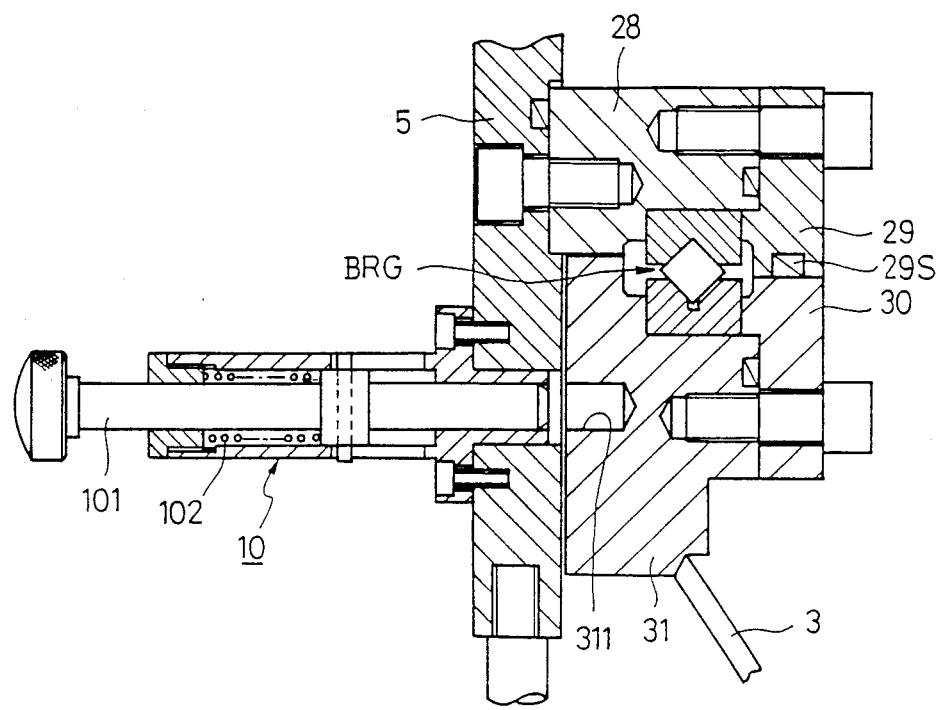
FIG. 3 is a cross section, to an enlarged scale and taken along the line III—III shown in FIG. 1.

Referring to FIG. 3 which is a cross section, to an enlarged scale, taken along the line III—III shown in FIG. 1, thus illustrating the cross section of the latch 10, an annular bearing support member 31 is fixedly mounted around the edge of the circular opening in the second vessel member 3, and cooperates with an annular bearing support member 28 which is fixedly mounted on the support plate 5 to support a bearing BRG which is disposed in annular form along the opening in the member 3. Specifically, the bearing BRG allows the support plate 5 to be supported rotatable circumferentially of the support plate 5 with respect to the second vessel member 3. Seal rings 29, 30 are fixedly connected to the bearing support members 28, 31, respectively, with a seal member 29S interposed therebetween. In effect, the seal member 29S provides a seal for the relative rotation between the second vessel member 3 and the support plate 5.

The latch 10 is located opposite to the bearing support member 31 which is fixedly mounted on the second vessel member 3, and includes a pin member 101 which is normally urged toward the member 31 by a coiled compression spring 102. The bearing support member 31 is formed with openings 311 at locations each of which is opposed to the pin member 101 to allow it to advance thereinto when one of the torch 61, the holders $7_1$ to $7_8$ and the handler 9 is located opposite to the rotary shaft 20. Thus the pin member 101 represents a locking pin and also a positioning pin, and when its free end advances into one of openings 311, the rotation of the support plate 5 is inhibited. The pin member 101 must be removed from the opening 311 against the resilience of the spring 102 in order to allow the support plate 5 to be rotated. After the support plate 5 is rotated approximately to a desired position, the pin member 101 may be released, so that the free end of the pin member 101 moves into the opening 301 to stop the movement of and positions the support plate 5 when the pin member 101 is aligned with the opening 311 or when one of the torch 61, the holders $7_1$ to $7_8$ and the handler 9 is accurately located opposite to the rotary shaft 20.

Figure 4:
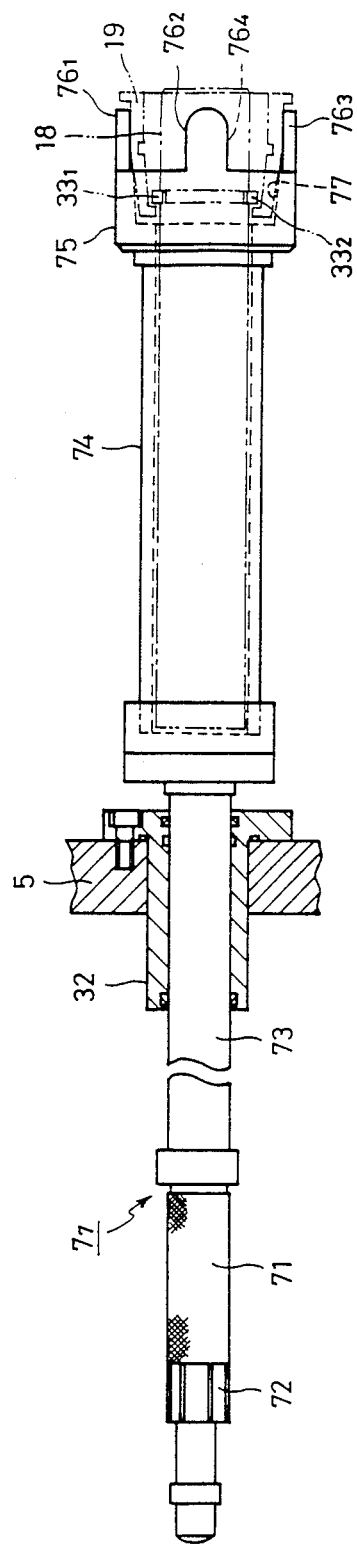
FIG. 4 is a cross section, to an enlarged scale and taken along the line IV—IV shown in FIG. 1.

FIG. 4 is an enlarged side elevation of a material rod holder $7_7$, and this Figure also represents an enlarged cross section taken along the line IV—IV shown in FIG. 1. The holder $7_7$ includes a grip 71, a portion 73 extending through the vessel, a rod stowage 74 which is to be positioned within the internal space PCS, and a mounting hand 75. The portion 73 extends through a seal member which is integral with a hermetically sealed bearing 32 which extends through the support plate 5, whereby it can be moved back and forth across the support plate 5. It is also rotatable about its own axis. The grip 71 is formed with a hexagonal facet 72 similar to the profile of a hexagonal nut in order to effect such rotation in a forcible manner. A nut tightening tool may be engaged with the facet. The rod stowage 74 is cylindrical in configuration and has a bottom or a rear end which is secured to the portion 73. The mounting hand 75 which is cup-shaped is fixedly mounted on the free end of the stowage 74, the bottom wall of the cup 75 being formed with an opening which is aligned with an opening formed in the stowage 74 through which a material rod 18 can be inserted as indicated by phantom lines. The mounting hand 75 includes a cup-shaped internal surface 77 against which the side of a substantially cup-shaped tightening screw 19 (FIGS. 5a and 5b) abuts, and also includes four fingers $76_1$ to $76_4$ at its free end which can be moved into flutes $191_1$ to $191_8$ formed in the side of the tightening screw 19. It should be understood that other holders $7_1$ to $7_6$ and $7_8$ are similar in construction to the holder $7_7$.

Figure 5B:
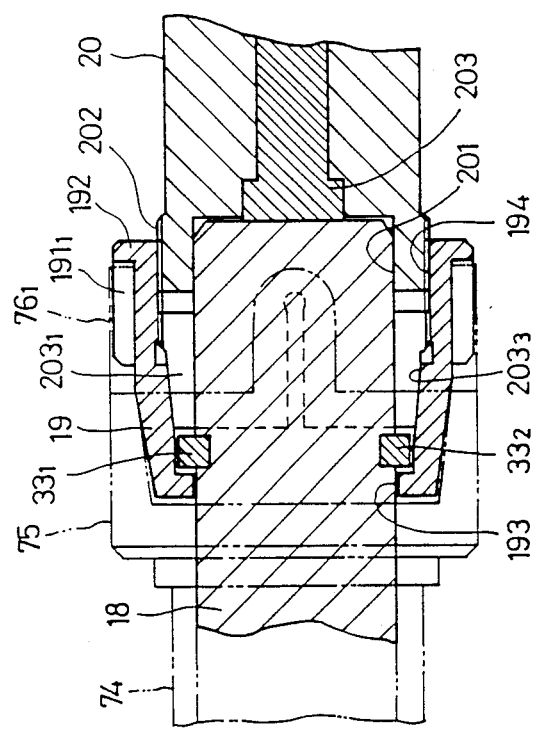
FIG. 5b is an enlarged longitudinal section of the tightening screw 19 shown in FIG. 2.
Figure 5A:
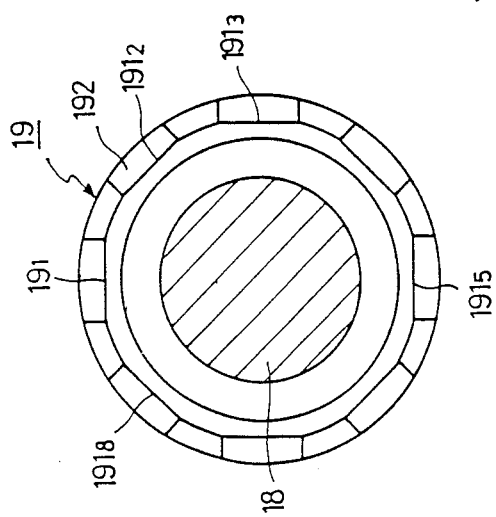
FIG. 5a is a front view, to an enlarged scale, of a tightening screw 19 shown in FIG. 2.

FIG. 5a shows an enlarged front view of the tightening screw 19 shown in FIG. 2, and FIG. 5b is a longitudinal section, to an enlarged scale, of the material rod 18, the tightening screw 19 and the rotary shaft 20 shown in FIG. 2. The tightening screw 19 is cup-shaped, and has an opening 193 formed in its bottom through which the material rod 18 extends. It is provided with a flange 192 around the edge of an upper opening. Flutes $191_1$ to $191_8$ are circumferentially distributed at an equal spacing and extend to the location of the flange 192 along the outer surface of the screw. The inner surface of the tightening screw 19 is formed with female threads 194 which are threadably engaged by a male thread 202 of the rotary shaft 20.

The free end of the rotary shaft 20 is substantially cup-shaped and is formed with a bore 201 to receive the material rod 18, and an axial copper core 203 is fitted centrally in the rotary shaft 20 for connecting the material rod 18 with a power feeding unit 24. The cup-shaped sidewall at the front end of the rotary shaft 20 is formed with four slits $203_1$ to $203_4$ which are located at an equal spacing in a circumferential direction and which are open at their foremost ends. In a region of these slits $203_1$ to $203_4$, the external peripheral surface of the rotary shaft 20 is formed with the male thread 202.

The material rod 18 is in the form of a solid cylinder, and is formed with an annular groove in its rear end. A pair of split ring halves $33_1$ and $33_2$ are fitted into the annular groove while the front end of the material rod 18, namely, the end which is to be granulated, is passed through the bottom opening 193 in the tightening screw 19. The rear end of the material rod 18 is inserted into the bore 201 formed in the front end of the rotary shaft 20, and the screw 19 is turned or tightened to cause it to be threadably engaged with the male thread 202 formed on the free end of the rotary shaft 20. By tightening the screw 19, it urges the ring halves $33_1$ and $33_2$ toward the rotary shaft 20, whereby the material rod 18 is pressed inward into the rotary shaft 20 into abutment against the copper core 203 while the tightening of the screw 19 causes the portion of the rotary shaft 20 where the slits are formed to be pressed toward the axis thereof, thus clamping the external peripheral surface of the material rod 18. The material rod 18 which is secured to the rotary shaft 20 in this manner is shown in FIGS. 5b and 2.

Under the condition that the pair of split ring halves $33_1$ and $33_2$ are fitted into the annular groove in the material rod 18 and the front end of the rod 18 is passed through the bottom opening in the tightening screw 19, the material rod 18, the ring halves $33_1$, $33_2$ and the screw 19 can be previously mounted on each of the holders $7_1$ to $7_8$ by inserting the front end of the rod 18 into the rod stowage 74 of the associated holder $7_1$ to $7_8$ and causing the tightening screw 19 to be received within the mounting hand 75, generally in a manner indicated by phantom lines in FIG. 5b. When so mounted, the fingers $76_1$ to $76_4$ of the mounting hand 75 are fitted into the flutes $191_1$, $191_3$, $191_5$, $191_7$ in the tightening screw 19, as shown in phantom lines in FIG. 4, so that when the mounting hand 75 for the holders ($7_1$ to $7_8$) is located opposite to the rotary shaft 20 from which the material rod 18 and the tightening screw 19 are disengaged, the holder may be translated toward the rotary shaft 20 to thereby cause the tail or rear end of the material rod 18 held thereby to be advanced into the bore 201 in the rotary shaft 20, and the holder may be rotationally driven to cause the tightening screw 19 which is carried thereby to be threadably engaged with the rotary shaft 20 to tighten the screw 19, thus allowing the screw 19 and the material rod 18 held by the holder to be integrally coupled to the rotary shaft 20 as shown in FIG. 5b. When the holder is then retracted, it returns to its retracted position while allowing the material rod 18 and the screw 19 to be withdrawn from within the rod stowage 74 and the mounting hand 75.

In this manner, by mounting the material rod 18 and the tightening screw 19 in the rod stowage 74 and the mounting hand 75 for the holders $7_1$ to $7_8$ as shown in phantom lines in FIG. 4 under the condition that the pair of split ring halves $33_1$ and $33_2$ are fitted into the annular groove in the rod 18 and the front end of the rod 18 is passed through the bottom opening in the tightening screw 19, these members can be fixedly connected with the rotary shaft 20 through three operations of the holders ($7_1$ to $7_8$), namely, translation toward the rotary shaft 20, a turning of the holder and a retracting movement of the holder.

When dismounting the screw 19 from the rotary shaft 20, an empty holder, which was previously holding the material rod 18 which is currently mounted on the rotary shaft 20, is positioned in opposing relationship with the rotary shaft 20, and then the holder is translated forwardly to engage the fingers $76_1$ to $76_4$ of the mounting hand 75 with the flutes $191_1$, $191_3$, $191_5$ and $191_7$ in the tightening screw 19, which is then held coupled to the rotary shaft 20, followed by turning the holder to loosen the tightening screw 19. When the screw 19 is disengaged from the rotary shaft 20, the holder can be retracted. When the holder is retracting, the screw 19 is supported by the mounting hand 75 to move therewith or falls down within the space PCS. Since the ring halves $33_1$, $33_2$ are split, they fall down from the material rod 18. However, the material rod 18 remains on the rotary shaft 20.

Figure 6:
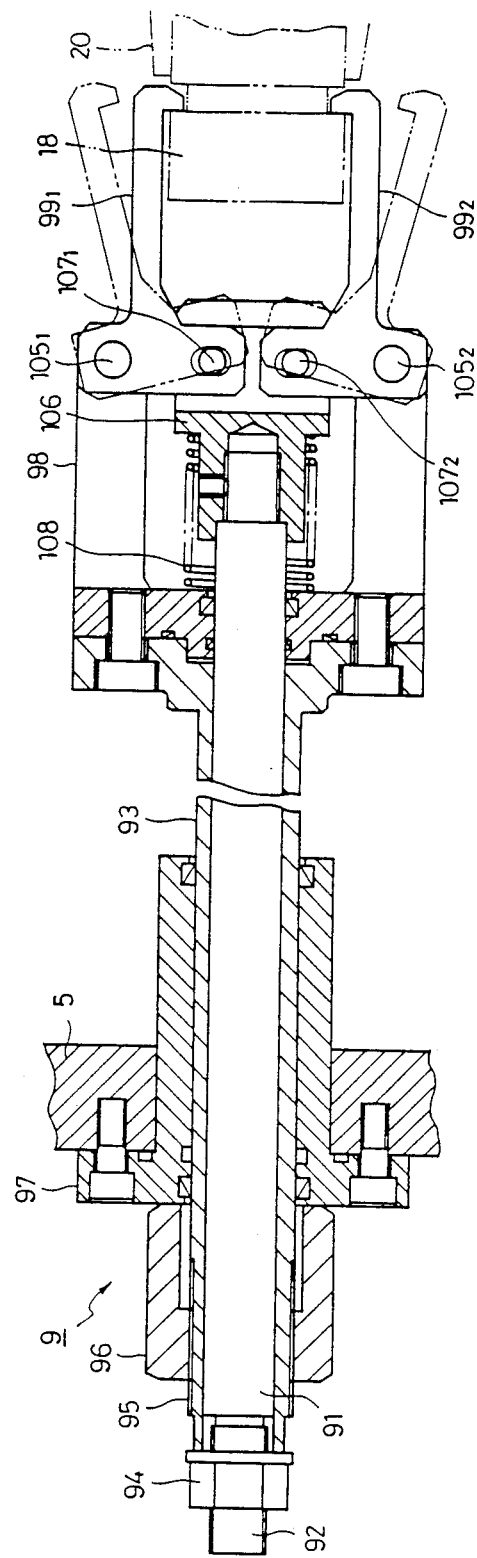
FIG. 6 is a cross section, to an enlarged scale and taken along the line VI—VI shown in FIG. 1.

In the present embodiment, the rod removal handler 9 is used to disengage the material rod 18 which remains in place in a manner mentioned above from the rotary shaft 20. FIG. 6 is an enlarged longitudinal section of the handler 9, taken along the line VI—VI shown in FIG. 1. A hollow shaft 93 extends through a seal member for a hermetically sealed bearing 97 which extends through the support plate 5, and is translatable in the direction of the axis as well as rotatable with respect to the bearing 97. An end of the hollow shaft 93 located outside the support plate 5 or on the atmospheric side is peripherally formed with a male thread 95, which is threadably engaged with female threads of a nut 96. A front end of the shaft 93 which extends into the space PCS has a hand 98 secured thereto, the hand 98 having a pair of opposing fingers $99_1$, $99_2$ pivotally connected at its free end in a swingable manner toward each other. Thus, the fingers $99_1$, $99_2$ are pivotally connected with the hand 98 by means of pins $105_1$, $105_2$. Part of the fingers $99_1$, $99_2$ advance into a substantially rectangular space encircled by a detent 106. As the detent 106 moves to the right, as viewed in FIG. 6, the fingers $99_1$, $99_2$ are caused to rotate counter-clockwise and clockwise, respectively, thus causing the fingers $99_1$ and $99_2$ to open relative to each other as indicated by phantom lines. When the detent 106 moves to the left, the fingers $99_1$ and $99_2$ rotate clockwise and counter-clockwise, respectively, thus closing these fingers as indicated in solid line. It will be noted that the free ends of the fingers $99_1$, $99_2$ are bent toward each other, which ends are adapted to be engaged with the annular groove in the material rod 18. FIG. 6 shows a material rod 18 which has been used and its supporting shaft 20 by phantom lines.

A rod 91 extending through the hollow shaft 93 has its front end extending through the hand 98 in a hermetically sealed manner, and the detent 106 is fixedly mounted on this end of the rod 91. The detent 106 is normally urged to the right by a coiled compression spring 108. The rear end of the rod 91 is formed with a male thread 92, which is threadably engaged with a nut 94. By grasping the nuts 96, 94 and pushing the hollow shaft 93 toward the space PCS which is located inwardly of the support plate 5, the hand 98 can be driven in the same direction until the right end of the nut 96 abuts against a flange on the hermetically sealed bearing 97. Thus, the nut 96 represents a stop or positioning member which limits the stroke of movement of the hand 98 to the right. The stop position can be adjusted by screwing in and out the nut 96. Since the detent 106 is urged to the right by the resilience of the spring 108, the rod 91 is normally urged to the right, whereby a washer which is disposed in abutment against the nut 94 is normally maintained in abutment against the left or rear end face of the hollow shaft 93. As the nut 94 is screwed in, the fingers $99_1$, $99_2$ are closed, and as the nut 94 is screwed out, the fingers $99_1$, $99_2$ open.

After disengaging the screw 19 from the shaft 20 by using the holder ($7_1$ to $7_8$) as shown in solid line in FIG. 5b, the pin member on the latch 10 may be drawn, and the support plate 5 may be rotated by grasping bars $11_1$ to $11_6$ which are fixedly mounted on its lateral surface at an equal spacing, thus moving the rod removal handler 9 to a location where it is opposite to the rotary shaft 20 (or the used material rod 18). The nut 94 may then be turned to open the fingers $99_1$, $99_2$, and the hollow shaft 93 may be pushed inward of the support plate 5 to move the free ends of the fingers $99_1$, $99_2$ to positions where they are opposite to the annular groove in the material rod 18. The nut 94 may then be turned to close the fingers $99_1$, $99_2$, whereby the free ends of these fingers are engaged with the annular groove in the material rod 18, shown in phantom lines, as indicated in solid line in FIG. 6. The hollow shaft 93 may then be driven in a direction toward the outside of the support plate 5 or to the left as viewed in FIG. 6. This causes the material 18 to be withdrawn from the rotary shaft 20, whereupon it falls down in the space PCS.

Returning to FIG. 2, it will be noted that a lower portion of the first vessel member 1 is shaped as a chute, with a relatively large mesh metal network 17 disposed intermediate the chute. The tightening screw 19 which is removed from the rotary shaft 20 returns to the holder $7_1$ to $7_8$. However, if the screw 19 falls down from the holder while it is being driven in the retracting direction or from right to left as viewed in FIG. 4, the screw 19 falls onto the network 17. The pair of split ring halves $33_1$ and $33_2$ which are disengaged from the material rod 18 as the screw 19 is disengaged also fall onto the network 17. The material rod 18 which is withdrawn from the rotary shaft 20 by means of the handler 9 in the manner mentioned above also falls onto the network 17.

Continuing reference to FIG. 2, the rotary shaft 20 extends through the first vessel member 1 by being supported by a bearing 21 which is designed to provide a high level of hermetic seal and allows a high speed rotation, and is connected to a drive shaft 22 outside the first vessel member 1. A pair of pneumatic brakes 23 are disposed on the opposite sides of the drive shaft 22, and each of the brakes 23 includes an air cylinder to which a high pressure air may be automatically supplied so that the brakes 23 project their brake shoes to hold the drive shaft therebetween. The drive shaft 22 is then constrained and held stationary. The purpose of constraining and maintaining the drive shaft 22 stationary is to prevent a rotation of the rotary shaft 20 when a rotating force is applied to the rotary shaft 20 from the holder $7_1$ to $7_8$ through the tightening screw 19, namely, when tightening and loosening the screw 19 to and from the rotary shaft 20.

The drive shaft 22 is coupled to the power feeder 24, and a given voltage is applied to the rotary shaft 20 or the material rod 18 through the power feeder 24 and the drive shaft. The drive shaft 22 is supported by an intermediate bearing 25, and passing therethrough, it is then coupled through a shaft coupler 26 to a rotary shaft of an electric motor 27. In this manner, the motor 27 is capable of driving the drive shaft 22 for rotation at a high speed.

A manner of using the described embodiment will now be described. Initially, the plasma torch 61, the holders $7_1$ to $7_8$ and the handler 9 are driven to their retracted positions, and nuts which are engaged with the bolts $4_1$ to $4_8$ are loosened, and the bolts $4_1$ to $4_8$ are brought to their prostrate positions, thus opening the second vessel member 3 through an angle on the order of 90°. Under this open condition, the tightening screw 19, the split ring halves $33_1$, $33_2$, and used material rod 18 which are located on the network 17 are recovered. The front end of the plasma torch 61 is inspected or repaired as required. The front end of the rotary shaft 20 is also inspected, and is cleaned as required. If both the plasma torch 61 and the rotary shaft 20 are found to be normal, the split ring halves $33_1$, $33_2$ are engaged with the annular groove in a fresh material rod 18 and held in place by the tightening screw 19 to dispose the material rod 18 and the ring halves in the stowage 74 and the hand 75 of the respective holder $7_1$ to $7_8$. The condition which is achieved at this stage is illustrated by the stowage 74, the hand 75, the tightening screw 19, the ring halves $33_1$, $33_2$ and the material rod 18 shown in phantom lines in FIGS. 4 and 5b.

The second vessel member 3 is then closed, and the bolts $4_1$ to $4_8$ are brought to their erected positions, with their washers and nuts mounted thereon engaged with the corresponding abutments on the second vessel member 3 and all the nuts are tightened to achieve a hermetic seal between the first and the second vessel member 1, 3. The evacuation of the space PCS is then initiated, and one of the holders (for example, $7_1$) is moved to a location where it is opposite to the rotary shaft 20, and the material rod 18 held thereby is mounted on the rotary shaft 20. The plasma torch 61 is then brought into opposing relationship with the material rod 18 which is mounted on the rotary shaft 20, and is then driven forward until a given position is reached, which corresponds to the position where the plasma injection may be initiated.

When a given level of vacuum is achieved within the space PCS, the evacuation may be stopped, and argon gas may be fed into the space PCS until a given pressure is reached. The motor 27 is then energized for rotation, and when the rotational speed of the motor becomes stabilized at a given speed, the plasma torch 61 is energized to initiate the plasma injection. As the plasma injection is initiated, the plasma torch 61 is driven toward the material rod 18 in order to prevent any increase in the distance between the torch 61 and the material rod 18 as the material rod 18 becomes consumed, generally in a known manner.

When the plasma injection is initiated, a melting of the material rod 18 begins at the point where the plasma impinges upon the foremost end face of the material rod 18, and the molten material is driven at a high speed radially with respect to the rotation due to the centrifugal force which results from a high speed rotation of the material rod 18. The resulting particles fall down, passing through the network 17 and through the valve 13 to be received within a container 14. When a given quantity of powder has been received in the container 14, the valve 13 is closed and the container 14 is changed, whereupon the valve 13 is reopened.

When the remaining length of the material rod 18 which is mounted on the rotary shaft 20 reaches a given size or reduces below it, the plasma injection is interrupted and the motor 27 ceases to be energized. The torch 61 is returned to its retracted position, and the support plate 5 is rotated to bring the holder $7_1$ to the location of the rotary shaft 20, disengaging the tightening screw 19 from the rotary shaft 20 utilizing the holder $7_1$. The support plate 5 is then rotated to bring the handler 9 into alignment with the rotary shaft 20, thus withdrawing the material rod 18 from the rotary shaft 20. Subsequently, the support plate 5 is rotated to bring the holder $7_2$ to the location of the rotary shaft 20, and the material rod 18 which is held by the holder $7_2$ is mounted on the rotary shaft 20. The support plate 5 is then rotated to bring the plasma torch 61 into opposing relationship with the material rod 18 on the rotary shaft 20, the torch 61 is moved forward to its location designed for initiating the plasma injection, and the motor 27 is energized for rotation, thus initiating the next plasma injection.

During a variety of operations as described above which takes place while the second vessel member 3 is held closed in a hermetically sealed manner or whenever a monitoring of conditions is required, an area around the rotary shaft 20 can be visually inspected through the hermetically sealed peep windows $12_1$ to $12_3$ which are disposed in the second vessel member 3.

It will thus be seen that granulation of eight material rods 18 through the plasma injection takes place once the second vessel member 3 is closed to the first vessel member 1 in a hermetically sealed manner, and upon termination of the granulation, the second vessel member 3 is opened.

In the described embodiment, the second vessel member 3 on which the support plate 5 is mounted is chosen as a swingable structure, but it should be understood that the member 3 may be held stationary while another member, namely, the first vessel member 1, which supports the rotary shaft 20 and its coupled drive mechanism, may be designed to be swingable. In addition, rather than utilizing the holders $7_1$ to $7_8$ to clamp the tightening screw 19 or loosen it, the holders $7_1$ to $7_8$ may be used for purpose of temporarily mounting or inserting the material rod 18 onto or into the rotary shaft 20, and the handler 9 may be used to operate the tightening screw 19.

What we claimed is:

1. An apparatus for manufacturing powder comprising
    a first and a second vessel member which are movable relative to each other for defining a hermetically sealed space in which granulation takes place;
    a rotary shaft supported by the first vessel member and carrying support means at its free end which are used to support a member of raw material disposed within the hermetically sealed space;
    drive means for driving the rotary shaft for rotation at a high speed;
    a support base rotatably mounted on the second vessel member about a center of rotation which is displaced from the axis of the rotary shaft and extending parallel thereto;
    a plasma torch supported by the support base on a circumference centered about the center of rotation thereof and struck therefrom with a radius equal to a distance measured from the center of rotation to the axis of the rotary shaft;
    a plurality of raw material holders supported by the support base on the circumference and each carrying a member of raw material;
    means for securing the member of raw material on one of the holders to the support means on the rotary shaft; and
    a handler supported by the support base on circumference for removing the member of raw material supported by the support means on the rotary shaft from the support means.

2. An apparatus for manufacturing powder according to claim 1 in which each of the material holders includes a cylindrical stowage for receiving a member of raw material, the stowage extending through the support base in parallel relationship with the rotary shaft and having an opening therein which opens into the hermetically sealed space to feed the member of raw material thereinto.

3. An apparatus for manufacturing powder according to claim 2 in which the support means on the rotary shaft includes a bore formed in a front end face of the rotary shaft for receiving the member of raw material, a plurality of spaced grooves formed in a wall surrounding the opening, and a male thread formed on the outer surface of the wall, and in which the securing means includes a tightening screw having female threads formed therein which are threadably engageable with the male thread, the screw operating to urge a region of the rotary shaft in which the spaced grooves are formed toward the axis thereof as it is screwed in.

4. An apparatus for manufacturing powder according to claim 1 in which the handler comprises a hollow member extending through the support base in parallel relationship with the rotary shaft, a rod extending through the hollow member, a plurality of fingers coupled to an end of the hollow member which is located within the hermetically sealed space so as to be movable toward and away from the axis of the hollow member and operable to hold a member of raw material, and a linkage for driving the fingers toward the axis of the hollow member in response to a movement of the rod in one direction with respect to the hollow member and for driving the fingers away from the axis of the hollow member in response to a movement of the rod in the opposite direction.

5. An apparatus for manufacturing powder according to claim 1 in which each of the material holders includes a cylindrical stowage extending through the support base in parallel relationship with the rotary shaft and having an opening formed therein which opens into the hermetically sealed space to feed a member of raw material thereinto, the stowage being operable to receive a member of raw material; and in which the handler comprises a hollow member extending through the hollow base in parallel relationship with the hollow shaft, a rod extending through the hollow member, a plurality of fingers coupled to an end of the hollow member which is disposed within the hermetically sealed space so as to be movable toward and away from the axis of the hollow member, and a linkage for driving the fingers toward the axis of the hollow member in response to a movement of the rod in one direction with respect to the hollow member and for driving the fingers away from the axis of the hollow member in response to a movement of the rod in the opposite direction.

6. An apparatus for manufacturing powder according to claim 5 in which the support means on the rotary shaft comprises a bore formed in a front end face of the rotary shaft for receiving a member of raw material, a plurality of spaced grooves formed in a wall which surrounds the opening, and a male thread formed on the outer surface of the wall, and in which the securing means includes a tightening screw having female threads formed therein which are threadably engageable with the male thread, the screw being operable to urge a region of the rotary shaft in which the spaced grooves are formed toward the axis thereof as it is screwed in.

7. An apparatus for manufacturing powder according to claim 6 in which the member of raw material being formed with an annular groove around its peripheral surface at its one end, the securing means including a plurality of split ring segments which form substantially a single ring together and which are adapted to be fitted in the annular groove and project outside the peripheral surface thereof, each of the material holders additionally including a cup-shaped hand having an opening formed in its bottom which communicates with an opening formed in the stowage which opens into the hermetically sealed space, the hand receiving the tightening screw therein and engageable with the outer surface of the tightening screw as the latter is being screwed on.

* * * * *